United States Patent
Baird et al.

(10) Patent No.: US 11,697,730 B2
(45) Date of Patent: Jul. 11, 2023

(54) THERMOPLASTIC COMPOSITES FOR USE IN FUSED FILAMENT FABRICATION, A 3D PRINTING PROCESS

(71) Applicant: Virginia Tech Intellectual Properties, Inc., Blacksburg, VA (US)

(72) Inventors: Donald G. Baird, Blacksburg, VA (US); Mubashir Q. Ansari, Midland, MI (US); Craig D. Mansfield, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 21 days.

(21) Appl. No.: 17/050,345

(22) PCT Filed: Apr. 26, 2019

(86) PCT No.: PCT/US2019/029449
§ 371 (c)(1),
(2) Date: Oct. 23, 2020

(87) PCT Pub. No.: WO2019/210236
PCT Pub. Date: Oct. 31, 2019

(65) Prior Publication Data
US 2021/0095115 A1    Apr. 1, 2021

Related U.S. Application Data (60) Provisional application No. 62/662,956, filed on Apr. 26, 2018.

(51) Int. Cl.
*C08L 67/03* (2006.01)
*B33Y 10/00* (2015.01)
(Continued)

(52) U.S. Cl.
CPC .......... *C08L 67/03* (2013.01); *B29C 64/118* (2017.08); *B29C 64/314* (2017.08); *B33Y 10/00* (2014.12);
(Continued)

(58) Field of Classification Search
CPC ........ C08L 67/03; C08L 55/02; B29C 64/118; B29C 64/314; B33Y 10/00; B33Y 40/10;
(Continued)

(56) References Cited

U.S. PATENT DOCUMENTS 4,224,433 A * 9/1980 Calundann .......... C08G 63/605
528/125
4,230,817 A * 10/1980 Charbonneau ....... C08G 63/065
528/206
(Continued)

OTHER PUBLICATIONS

International Application No. PCT/US2019/029449, International Search Report dated Jun. 26, 2019.
(Continued)

*Primary Examiner* — Nahida Sultana
(74) *Attorney, Agent, or Firm* — Innovators Legal (57) ABSTRACT

In various aspects, reinforced composite filaments, methods of making reinforced composite filaments, and methods of producing reinforced composite filament are all provided herein. The reinforced composite filaments can include a thermoplastic polymer matrix having dispersed therein reinforcing fibers composed of a thermotropic liquid crystalline polymer. In some aspects, the thermoplastic polymer matrix is chosen such that a processing temperature for the thermoplastic polymer matrix is below a melting temperature of the thermotropic liquid crystalline polymer. In some aspects, the thermotropic liquid crystalline polymer is chosen such that a solidification temperature of the thermotropic liquid crystalline polymer is below an upper processing temperature of the thermoplastic polymer matrix. The filaments can
(Continued)

be used for fused deposition manufacturing of a variety of parts, especially for the automotive and other industries.

12 Claims, 9 Drawing Sheets

(51) Int. Cl.
  *B29C 64/314* (2017.01)
  *B29C 64/118* (2017.01)
  *B33Y 40/10* (2020.01)
  *B33Y 70/10* (2020.01)
  *C08L 55/02* (2006.01)
  *B33Y 70/00* (2020.01)
  *B29K 101/12* (2006.01)
  *B29K 105/00* (2006.01)

(52) U.S. Cl.
  CPC .............. *B33Y 40/10* (2020.01); *B33Y 70/00* (2014.12); *B33Y 70/10* (2020.01); *C08L 55/02* (2013.01); *B29K 2101/12* (2013.01); *B29K 2105/0079* (2013.01)

(58) Field of Classification Search
  CPC .... B33Y 70/00; B33Y 70/10; B29K 2101/12; B29K 2105/0079; C08G 63/183; C08G 63/191; C08G 63/605
  See application file for complete search history.

(56) References Cited

U.S. PATENT DOCUMENTS

| | | | | |
|---|---|---|---|---|
| 5,070,157 | A | | 12/1991 | Isayev et al. |
| 5,225,488 | A | | 7/1993 | Baird et al. |
| 5,260,380 | A | * | 11/1993 | Isayev ................... C08L 101/00 525/391 |
| 5,401,779 | A | * | 3/1995 | Edelman ............ C09K 19/3809 523/205 |
| 6,051,175 | A | * | 4/2000 | Kurihara .................. D04H 3/02 264/210.8 |
| 2016/0289491 | A1 | | 10/2016 | Li et al. |
| 2020/0290269 | A1 | * | 9/2020 | Okonski ................ C08J 7/0427 |
| 2020/0290271 | A1 | * | 9/2020 | Carlson .................. B33Y 40/10 |
| 2022/0033998 | A1 | * | 2/2022 | Wetzel ............ B29D 11/00701 |

OTHER PUBLICATIONS

Ansari et al., A Process for Generating Composites of Acrylonitrile-Butadiene-Styrene Reinforced with a Thermotropic Liquid Crystalline Polymer for Use in Fused Filament Fabrication, SPE ANTEC Indianapolis, 2016, pp. 30-34.

Gray et al., Thermoplastic Composites Reinforced With Long Fiber Thermotropic Liquid Crystalline Polymers for Fused Deposition Modeling, Polymer Composites, vol. 19, No. 4, Aug. 1998, pp. 383-394.

* cited by examiner

THERMOPLASTIC COMPOSITES FOR USE IN FUSED FILAMENT FABRICATION, A 3D PRINTING PROCESS

CROSS-REFERENCE TO RELATED APPLICATIONS

This application is the 35 U.S.C. § 371 national stage application of PCT Application No. PCT/US2019/029449, filed Apr. 26, 2019, where the PCT claims priority to, and the benefit of, U.S. provisional application entitled "WHOLLY THERMOPLASTIC COMPOSITES FOR USE IN FUSED FILAMENT FABRICATION, A 3-D PRINTING PROCESS" having Ser. No. 62/662,956, Apr. 26, 2018, both of which are herein incorporated by reference in their entireties.

TECHNICAL FIELD

The present disclosure generally relates to additive manufacturing materials and methods, and in particular to composite filaments and methods of use for extrusion based additive manufacturing with improved mechanical properties.

BACKGROUND

Additive manufacturing (AM) has recently attracted immense attention both in industry as well as academia, due to its advantages, such as the ability to fabricate lighter parts due to innovative designs, less waste generation, cost reduction and lesser lead time in product development (see, e.g. B. Lyons, *The Bridge* 44 (3) (2014) and S. H. Huang, P. Liu, A Mokasdar and L. Hou, *The International Journal of Advanced Manufacturing Technology*, 1-13 (2013)). The push to adopt AM by the auto and aerospace industries comes from the intense pressure on these industries to improve fuel efficiency which significantly reduces the cost per mile of transportation and also the greenhouse gas emissions (B. P. Conner, G. P. Manogharan, A N. Martof, L. M. Rodomsky, C. M. Rodomsky, D. C. Jordan and J. W. Limperos, *Additive Manufacturing* 1, 64-76 (2014)). For AM to be used reliably in industries such as auto and aerospace, the mechanical properties must be dramatically improved.

Fused Filament Fabrication (FFF) and Fused Deposition Modeling (FDM) are the terms used interchangeably to describe extrusion based AM systems. In FFF, a filament is fed into a chamber, where it melts and is extruded out from a nozzle. The extruded material is laid down layer upon layer to fabricate objects. Acrylonitrile Butadiene Styrene (ABS), Polylactic Acid (PLA), and Polycarbonate (PC) are commonly used matrix polymers in FFF. Parts printed using FFF have poor mechanical properties, primarily due to poor filament properties. Numerous efforts have been made in improving the mechanical properties of the printed parts. Most of these efforts take advantage of superior mechanical properties of traditional fibers such as carbon and glass fiber. Improvement in the mechanical properties of the filaments depends on the length of the fibers in the filaments. Thus, there is a requirement of longer fibers in the filaments as longer fiber lengths lead to greater improvements.

There are many disadvantages in using traditional fibers. One major disadvantage is that continuous filament reinforcement is not possible due to significant fiber breakage. The processing method utilized, use of extruders, to reinforce the filaments are known to break the fibers. One example of fiber breakage can be found in the work carried out by Tekinalp et al. (see e.g. Tekinalp, H.L., et al., *Highly oriented carbon fiber-polymer composites via additive manufacturing.* Composites Science and Technology, 2014. 105: p. 144-150). In this work, 3.5 mm carbon fiber was used to reinforce ABS for filament generation for processing in FFF. It was found that after reinforcing fiber lengths dropped below 0.4 mm. The maximum tensile strength and modulus obtained for the printed parts using carbon fiber reinforced filaments were around 65 MPa and 14 GPa, respectively. These properties were at 40 wt. % fiber loading. Thus, continuous filament reinforcement is not possible using traditional fibers to take maximum advantage of the reinforcing potential of the fibers.

Attempts have also been made at continuously reinforcing the printed parts by impregnating continuous fiber reinforcements during the printing process (see, e.g. Matsuzaki, R., et al., *Three-dimensional printing of continuous-fiber composites by in-nozzle impregnation*. Scientific reports, 2016. 6: p. 23058). These attempts require modification of the FFF machines. In addition, stiffness of the traditional fibers does not allow printing parts with intricate patterns that require taking sharp turns during the printing process. In the work carried out by Matsuzaki et al., utilizing continuous part reinforcement during printing, the maximum tensile strength and modulus obtained with a PLA matrix was 185.2 MPa and 19.5 GPa, respectively. Although, the mechanical properties are encouraging, the reinforcement required modification of the machine. In addition, only simple parts were printed with the reinforcement being severed at the end of each road as the stiffness of the fiber does not allow sharp turns. In a similar work carried out by Klift et al., to continuously reinforce using carbon fiber, tighter loops of reinforcement could not be printed due to stiffness of the fiber (see Van Der Klift, F., et al., *3D printing of continuous carbon fibre reinforced thermo-plastic (CFRTP) tensile test specimens*. Open Journal of Composite Materials, 2015. 6(01): p. 18). Moreover, mechanical severing of the reinforcement was needed to print different layers as only loops of reinforcement could be laid.

There remains a need for improved materials and methods for additive manufacturing that overcome the aforementioned deficiencies.

SUMMARY

In various aspects, reinforced composite filaments and methods of making and using thereof are provided that overcome one or more of the aforementioned deficiencies. In some aspects, the problems encountered using traditional fibers can be solved by using reinforced composite filaments described herein. These filaments have much better performance in the FFF machines compared to traditional composites. The use of thermoplastic reinforcement, which leads to fiber generation during the filament fabrication stage can eliminate fiber breakage problems. The reinforced composite filaments are reinforced using thermotropic liquid crystalline polymers (TLCP's), which are composed of rigid rod-like monomers. These are aligned under extensional kinematics yielding high mechanical properties. TLCP's being thermoplastics, possess low density and on blending with the matrices produce wholly thermoplastic composites. The key step in the fabrication of our wholly thermoplastic composite filaments is the selection of TLCP's. The selected TLCP's should have a melting temperature above that of the matrix polymer to avoid melting the TLCP during reprocessing of the filaments in FFF.

In some aspects, a reinforced composite filament is provided for use in fused filament fabrication. The reinforced composite filament can have a thermoplastic polymer matrix having dispersed therein reinforcing fibers composed of a thermotropic liquid crystalline polymer. By selecting a combination of a thermoplastic polymer matrix and a liquid crystalline polymer having the right combination of thermal properties, the reinforced composite filaments can be made that can be used for fused filament fabrication at temperatures that allow for the deposition without compromising the mechanical integrity of the printed parts. For example, in some aspects the reinforced composite filament is provided having both (i) a processing temperature for the thermoplastic polymer matrix that is below a melting temperature of the thermotropic liquid crystalline polymer; and (ii) a solidification temperature of the thermotropic liquid crystalline polymer that is below an upper processing temperature of the thermoplastic polymer matrix.

Methods of making the reinforced composite filaments are also provided. The methods can include (i) heating a thermotropic liquid crystalline polymer to a first elevated temperature with respect to the melting temperature of the thermotropic liquid crystalline polymer to form a heated melt; (ii) cooling the heated melt to a mixing temperature to form a super-cooled melt, wherein the mixing temperature is above the solidification temperature of the thermotropic liquid crystalline polymer, and wherein the mixing temperature is below the upper processing temperature of the thermoplastic polymer matrix; (iii) heating the thermoplastic polymer matrix to the mixing temperature to form a thermoplastic melt; (iv) blending the thermotropic liquid crystalline polymer super-cooled melt into the thermoplastic melt to form a blend; and (v) drawing the blend into the filaments.

The reinforced composite filament can be used for fused filament fabrication, and in particular for fused filament fabrication of parts requiring high structural integrity such as in the automotive and aerospace industries. In various aspects, methods are provided for making these parts using the reinforced composite filaments provided herein. The methods can include fused filament fabrication, fused deposition modeling, or big area additive manufacturing of a composite material at a processing temperature; wherein the composite material includes a thermoplastic polymer matrix having dispersed therein reinforcing fibers composed of a thermotropic liquid crystalline polymer; wherein the processing temperature is below a melting temperature of the thermotropic liquid crystalline polymer. Printed parts made by a process described herein are also provided, such as components for the automotive and aerospace industries.

Other systems, methods, features, and advantages of reinforced composite filaments, methods of making, and methods of use thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various aspects, described below, when taken in conjunction with the accompanying drawings.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of additive manufacturing, polymer processing, nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

In some instances, units may be used herein that are non-metric or non-SI units. Such units may be, for instance, in U.S. Customary Measures, e.g., as set forth by the National Institute of Standards and Technology, Department of Commerce, United States of America in publications such as NIST HB 44, NIST HB 133, NIST SP 811, NIST SP 1038, NBS Miscellaneous Publication 214, and the like. The units in U.S. Customary Measures are understood to include equivalent dimensions in metric and other units (e.g., a dimension disclosed as "1 inch" is intended to mean an equivalent dimension of "2.5 cm"; a unit disclosed as "1 pcf" is intended to mean an equivalent dimension of 0.157 $kN/m^3$; or a unit disclosed 100° F. is intended to mean an equivalent dimension of 37.8° C.; and the like) as understood by a person of ordinary skill in the art.

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Composite Filaments, Methods of Making and Uses Thereof

In various aspects, reinforced composite filaments are provided that overcome one or more of the aforementioned deficiencies. These filaments have much better performance in the FFF machines compared to traditional composites. The use of thermoplastic reinforcement, which leads to fiber generation during the filament fabrication stage can eliminate fiber breakage problems. The composites described herein are reinforced using thermotropic liquid crystalline polymers (TLCP's), which are composed of rigid rod-like monomers.

Thermotropic liquid crystalline polymers are polymers which are liquid crystalline (i.e., anisotropic) in the melt phase. These polymers have been described by various terms, including "liquid crystalline", "liquid crystal" and "anisotropic". Briefly, the polymers of this class are thought to involve a parallel ordering of the molecular chains. The state wherein the molecules are so ordered is often referred to either as the liquid crystal state or the nematic phase of the liquid crystalline material. These polymers are prepared from monomers which are generally long, flat and fairly rigid along the long axis of the molecule and commonly have chain-extending linkages that are either coaxial or parallel.

Such polymers readily form liquid crystals (i.e., exhibit anisotropic properties) in the melt phase. Such proper ties may be confirmed by conventional polarized light techniques whereby crossed polarizers are utilized. More specifically, the anisotropic melt phase may be confirmed by the use of a Leitz polarizing microscope at a magnification of 40× with the sample on a Leitz hot stage and under nitrogen atmosphere. The polymer is optically anisotropic; i.e., it transmits light when examined between crossed polarizers. Polarized light is transmitted when the sample is optically anisotropic even in the static state.

Thermotropic liquid crystalline polymers include but are not limited to wholly aromatic polyesters, aromatic-aliphatic polyesters, aromatic polyazomethines, aromatic polyester-carbonates and wholly or non-wholly aromatic polyester-amides The wholly aromatic polymers are considered to be "wholly" aromatic in the sense that each moiety present in the polymer contributes at least one aromatic ring to the polymer backbone and which enables the polymer to exhibit anisotropic properties in the melt phase.

The thermotropic liquid crystalline polymers are aligned under extensional kinematics yielding high mechanical properties. TLCP's being thermoplastics, possess low density and on blending with the matrices produce wholly thermoplastic composites. An important step in the fabrication of our wholly thermoplastic composite filaments is the selection of TLCP's. The selected TLCP's should generally have a melting temperature above that of the matrix polymer to avoid melting the TLCP during reprocessing of the filaments in FFF. In addition, the temperature selected for processing in FFF needs to be such that relaxation in orientation of the TLCP's is a minimum to avoid loss in mechanical properties. Two different processing techniques can be utilized to generate the TLCP reinforced composites.

Matrix polymers that degrade at the processing temperature of the TLCP's can be reinforced using a dual extrusion system. In such cases, the supercooling behavior of TLCP's is taken advantage of. Most TLCP's, once heated to temperatures that melt all the higher melting crystallites leads to solidification at temperature much lower than the melting temperature. This is referred to herein as "supercooling". On the other hand, the matrix polymers that exhibit compatible processing temperatures can be directly blended in a single extruder at the processing temperature of the TLCP. The use of dual extrusion technology is recommended for all matrix polymer-TLCP combinations to generate nearly continuous fibrils.

In some aspects, a reinforced composite filament is provided for use in fused filament fabrication, the reinforced composite filament comprising a thermoplastic polymer matrix having dispersed therein reinforcing fibers composed of a thermotropic liquid crystalline polymer; wherein a processing temperature for the thermoplastic polymer matrix is below a melting temperature of the thermotropic liquid crystalline polymer; and wherein a solidification temperature of the thermotropic liquid crystalline polymer is below an upper processing temperature of the thermoplastic polymer matrix.

In some aspects, the processing temperature for the thermoplastic polymer matrix is about 20° C., about 25° C., or about 30° C. to about 45° C., about 55° C., or about 60° C. below the melting temperature of the thermotropic liquid crystalline polymer. This allows the processing and deposition of the composite without melting the TLCP or otherwise degrading the structural integrity of the TLCP.

In some aspects, the solidification temperature of the thermotropic liquid crystalline polymer is about 5° C. to about 20° C. below the upper processing temperature of the thermoplastic polymer matrix. It is important that the polymers can be processed at similar temperatures and, given the difference in melting temperatures the TLCP can be chosen to have supercooling properties. By heating the TLCP to a temperature well above its melting temperature (and therefore well above the temperature of the host polymer) and then cooling to a temperature below the upper processing temperature for the host polymer, the two polymers can be processed together.

In some aspects, the reinforced composite filament is made by a process comprising (i) heating the thermotropic liquid crystalline polymer to a first elevated temperature with respect to the melting temperature of the thermotropic liquid crystalline polymer to form a heated melt; (ii) cooling the heated melt to a mixing temperature to form a super-cooled melt, wherein the mixing temperature is above the solidification temperature of the thermotropic liquid crystalline polymer, and wherein the mixing temperature is below the upper processing temperature of the thermoplastic polymer matrix; (iii) heating the thermoplastic polymer matrix to the mixing temperature to form a thermoplastic melt (iv) blending the thermotropic liquid crystalline polymer super-cooled melt into the thermoplastic melt to form a blend; and (v) drawing the blend into the filaments. In some aspects, the super-cooled melt is stable for a period of time from about 30 minutes to about 3 hours at the mixing temperature.

The polymers can be present in essentially any amount suitable for the given application. The amount of reinforcing polymer can depend upon the specific structural needs of the given application. In some aspects, the thermotropic liquid crystalline polymer is present in an amount from about 10, about 15, about 20 or about 25 percent by weight and up to about 40, about 45, about 50, about 60, about 70, or about 80 percent by weight based upon an entire weight of the reinforced composite filament. In some aspects, the thermotropic liquid crystalline polymer includes fibers having an average diameter from about 0.1 microns or about 0.5 microns and up to about 5 microns or 10 microns.

The TLCP can be used to reinforce any of a number of polymers. In some aspects, the thermoplastic polymer matrix includes a polymer selected from the group consisting of acrylonitrile butadiene styrene, polylactic acid, polycarbonate, polyphenylene sulfide, polyamide, cellulose, polyethylene terephthalate, polymethylacrylate, polymethylmethacrylate, polypropylene, polyethylene, polyvinyl chloride, and copolymers and blends thereof.

The TLCP can be selected based upon the desired structural properties and the compatibility with the thermodynamic/temperature profiles of the materials. In some aspects, the TLCP includes a polymer selected from the group consisting of wholly aromatic polyesters, aromatic-aliphatic polyesters, aromatic polyazomethines, aromatic polyester-carbonates, wholly or non-wholly aromatic polyester-amides, and copolymers and blends thereof.

In some aspects, the reinforced composite filament can also include one or more additives such as a compatiblizers, stabilizers, antioxidants, flow aids, flame retardants, impact modifiers, nucleating agents, pigments, fillers, and other non-polymeric structural materials such as carbon nanotubes or or short glass fibers.

The reinforced composite filament can be drawn to filaments having various diameters depending upon the properties of the polymers and the needs of the printing device and application. In some aspects, the drawn filaments can be made having a diameter from about 0.5 mm or about 1 mm and up to about 3 mm, 5 mm, or 10 mm.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1: Acrylonitrile Butadiene Styrene-Thermotropic Liquid Crystalline Polymers (ABS-TLCP) Filaments Generation of ABS-TLCP Filaments ABS used in this work, MAGNUM 555, was supplied by Trinseo. The TLCP selected, Zenite HX8000, is composed of terephthalic acid (TA), 4-hydroxybenzoic acid (HBA), hydroquinone (HQ) and hydroquinone derivatives (HQ-derivatives) and was supplied by DuPont. The reason for selecting HX8000 is that it has a melting temperature of 280° C., well above the commonly used processing temperature of ABS, 200-240° C. Due to non-overlapping processing temperatures, ABS and HX8000 were processed using the dual extrusion system. In this technology, discussed elsewhere in detail [4, 6], the TLCP's and the matrix polymers are plasticated in two different extruders. TLCP is then injected into the matrix polymer using a multiport injection nozzle, following which the blend is passed through static mixers which subdivides the TLCP stream into finer streams. The extrudate is drawn at high draw ratio and subsequently cooled in a water bath. Do we need to reference the original patent at any point? This process might be carried out using two extryders without the mixing head.

Figure 1:
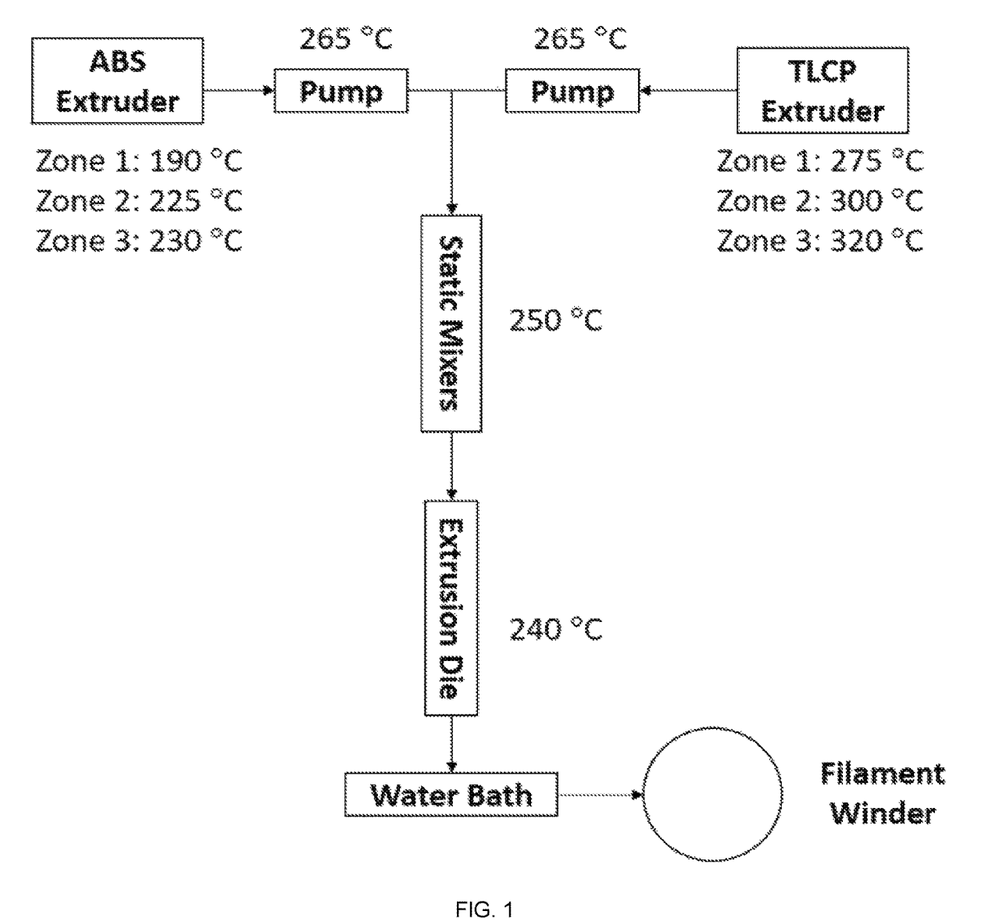
FIG. 1 is a temperature schematic used in an exemplary dual extrusion system for generating filaments composed of ABS and HX8000 according to Example 1.
Figure 2:
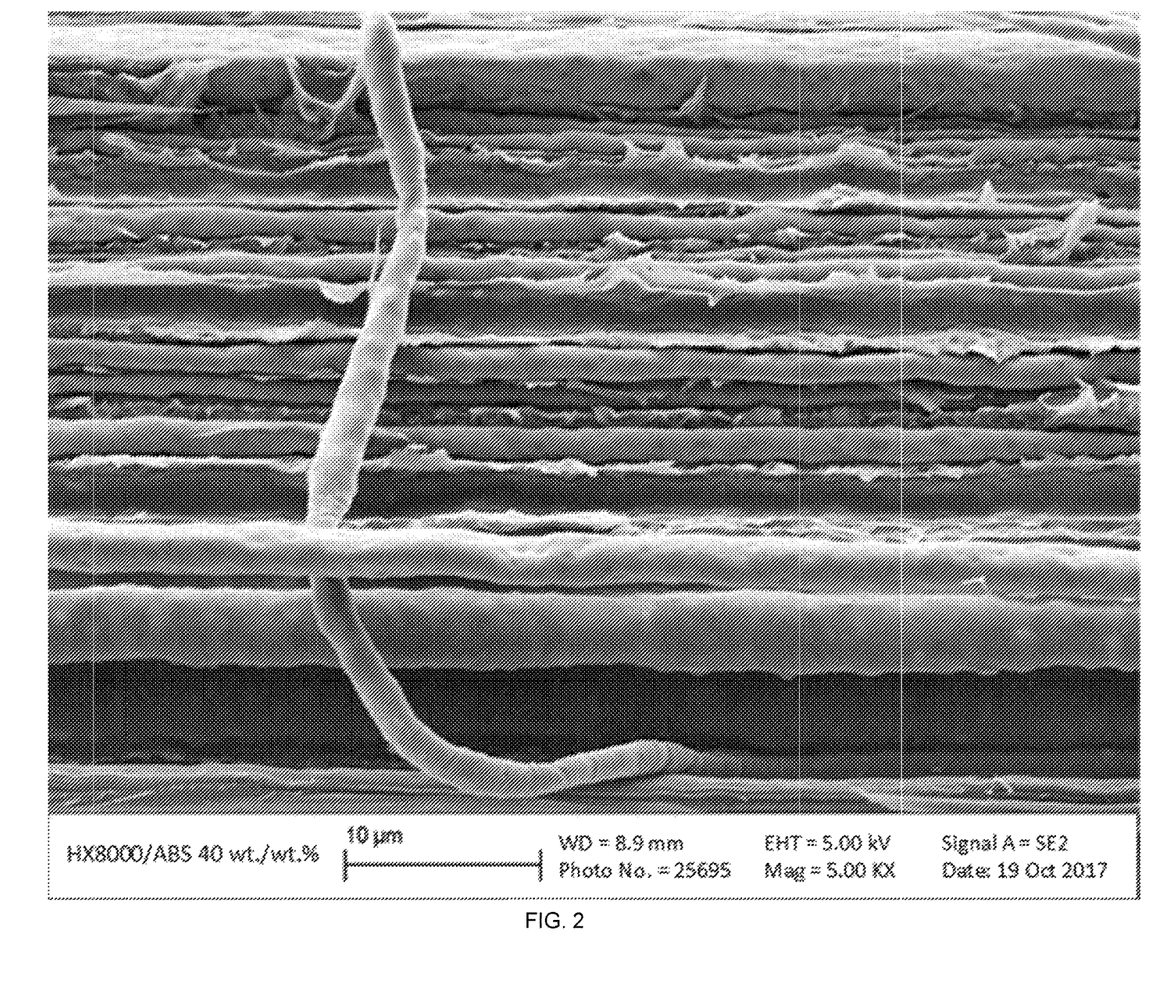
FIG. 2 is a scanning electron micrograph of the cryogenically fractured HX8000/ABS (40 wt. % TLCP) in the axial direction showing continuous reinforcement of the fibrils inside ABS matrix.

The temperatures selected for dual extrusion are shown in FIG. 1. These temperatures were selected by performing isothermal time sweeps on ABS at different temperatures to identify degradation temperatures. It was found that ABS is stable at temperatures below 270° C. for time periods that are required for processing in dual extrusion. Isothermal time sweeps were also performed on HX8000 at temperatures below its melting temperature after cooling from 320° C. to estimate solidification time at temperatures below its melting temperature. It was found that HX8000 solidifies at 235° C. when cooled from 320° C. Thus the temperatures shown in FIG. 1 process the polymers by avoiding degradation of ABS. The morphology of the filaments generated were studied using SEM and shows continuous reinforcement as can be seen in FIG. 2. Tensile strength and modulus obtained for the composite filaments were 169.2±4.0 MPa and 39.9±3.7 GPa, respectively.

Post Processing of the ABS-TLCP Filaments in FFF

Figure 3:
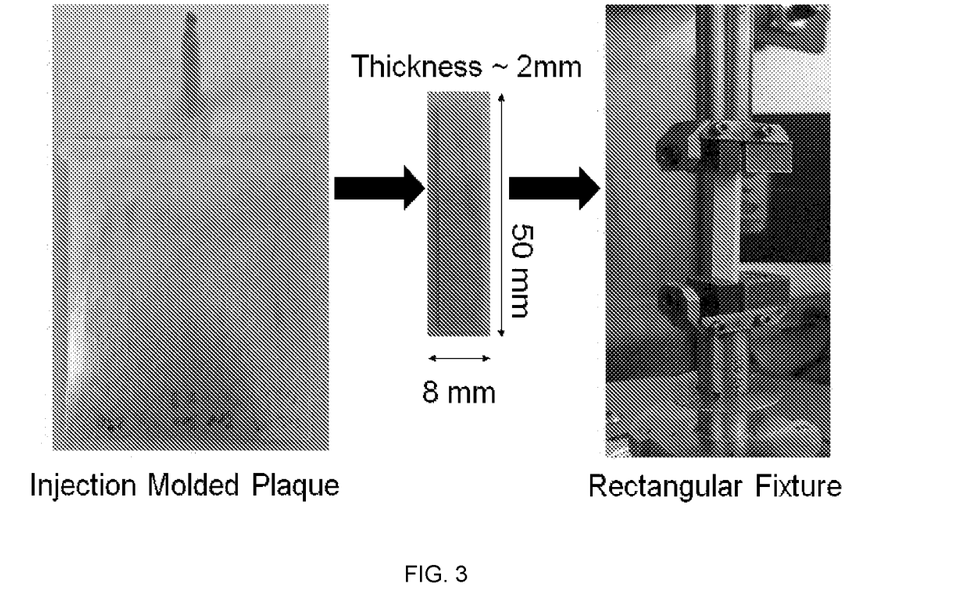
FIG. 3 is a schematic for identifying post processing temperature of the composite filaments of Example 1.

The processing conditions required for post processing the filaments were obtained using a Dynamic Mechanical Analysis (DMA) performed on pure injection molded strips as shown in FIG. 3. In these tests, the strips were heated to high temperatures and exposed for varying time duration and then cooled down. It was found that there was a loss in storage modulus when the strips were heated to temperatures above 240° C. At 240° C., the loss in storage modulus was insignificant if the exposure times were kept below 5 minutes. This time is in the processing time range of the filaments in FFF.

Figure 4A:
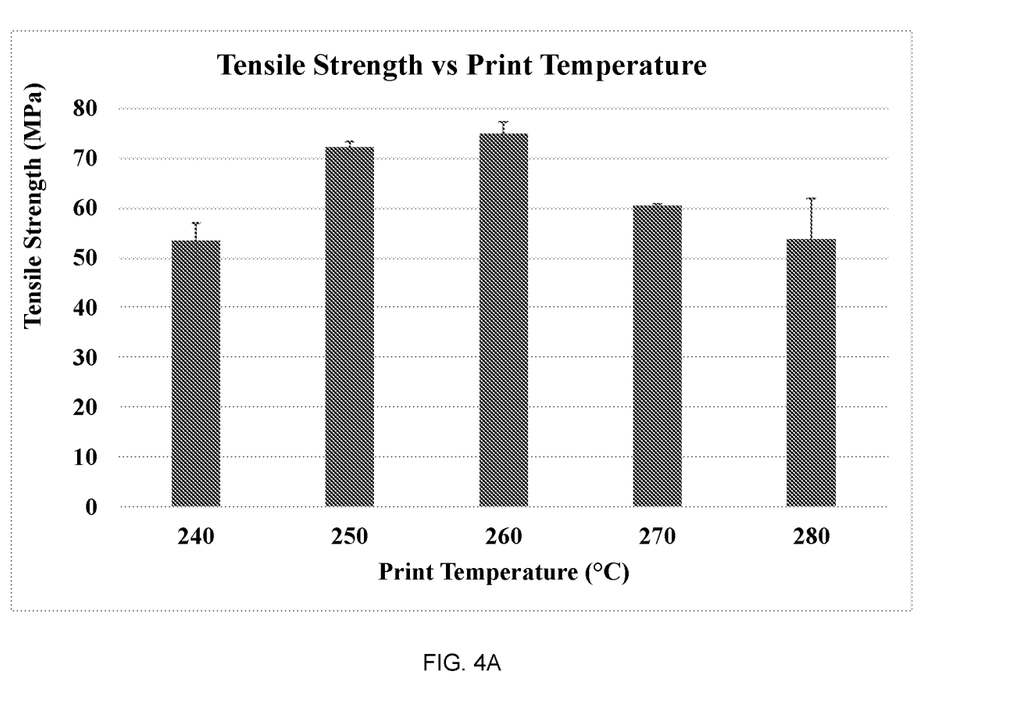
FIGS. 4A-4B are graphs of the tensile strength (FIG. 4A) and tensile modulus (FIG. 4B) of printed parts from Example 1 as a function of print temperature. Filaments used: 40 wt. % HX8000/ABS. Error bars represent 95% confidence intervals.
Figure 4B:
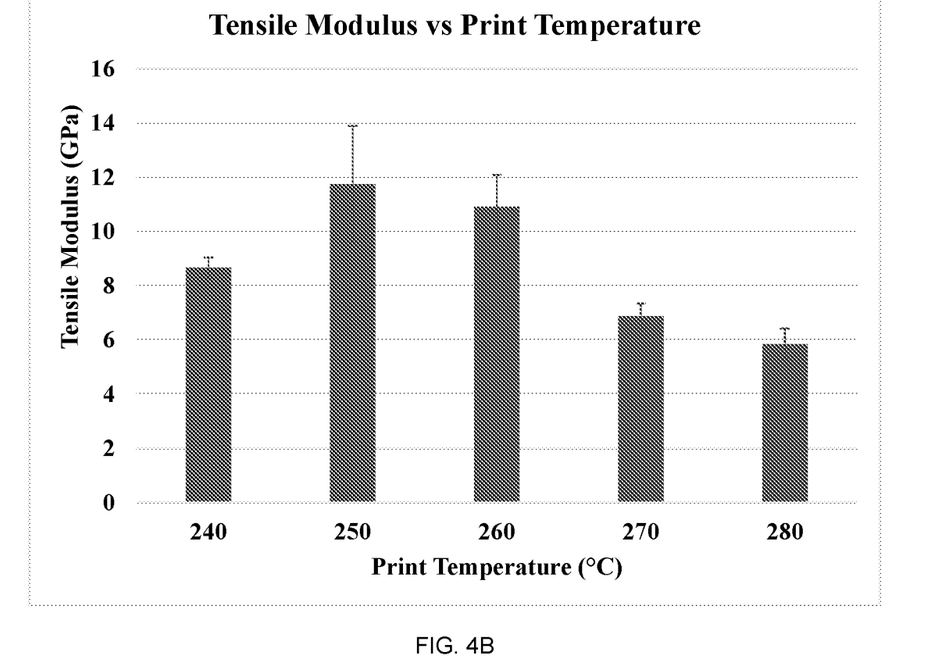
Figure 5:
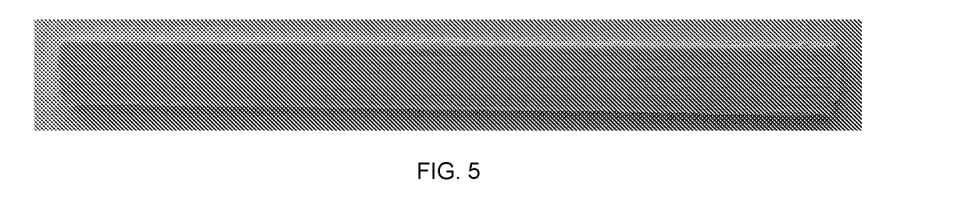
FIG. 5 is an image of 40 wt. % HX8000/ABS strip printed using FFF according to exemplary aspects of Example 1.

40 wt. % HX8000/ABS filaments were printed using FFF at different temperatures. The improvement in the tensile properties can be seen in FIGS. 4A-4B as a function of print temperature. The strips were printed by laying the roads next to each other and without severing at the end of the rod as shown in FIG. 5. In addition, severing was avoided to print the next layer. Whole specimen was printed without severing. Once the print was completed, the roads severed without requirement of any severing mechanism due to the flexibility of the reinforcing polymer at elevated temperatures. Maximum strength and modulus obtained on the printed parts were 74.9±2.4 MPa and 11.7±2.1 GPa, respectively. This is a significant improvement in comparison with the strips that were printed using pure ABS 240° C., the tensile strength and modulus of which were 30.4±0.9 MPa and 2.2±0.1 GPa, respectively.

Figure 6A:
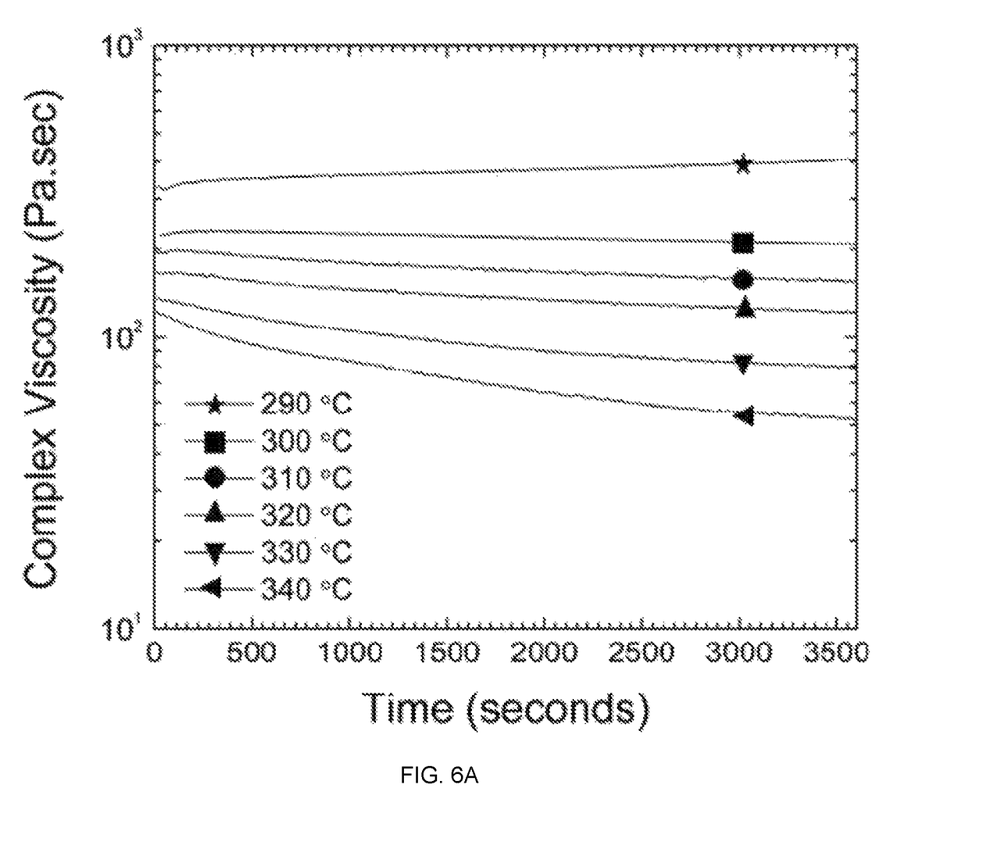
FIGS. 6A-6B are graphs of isothermal time sweeps on PPS in nitrogen atmosphere (FIG. 6A) and cooling temperature ramps on HX3000 (FIG. 6B) according to exemplary aspects of Example 2. The top and bottom curves at each temperature represent the loss and the storage modulus.
Figure 6B:
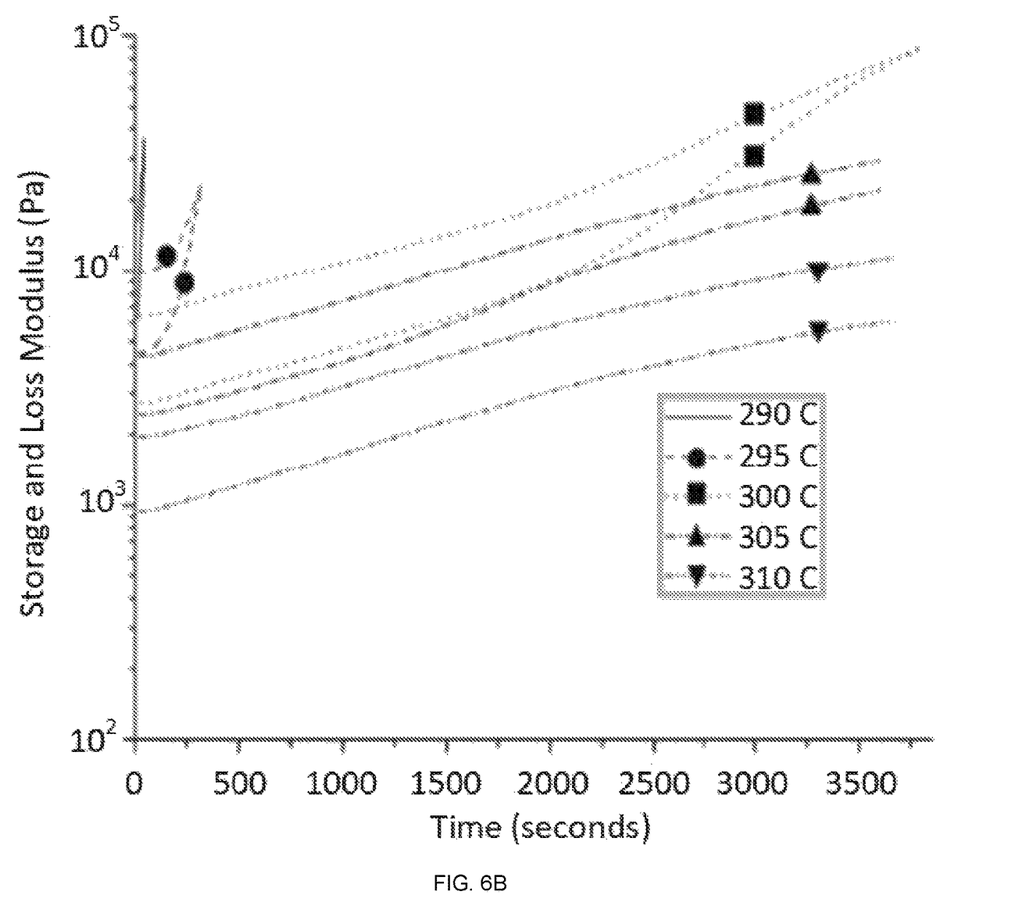
Figure 7:
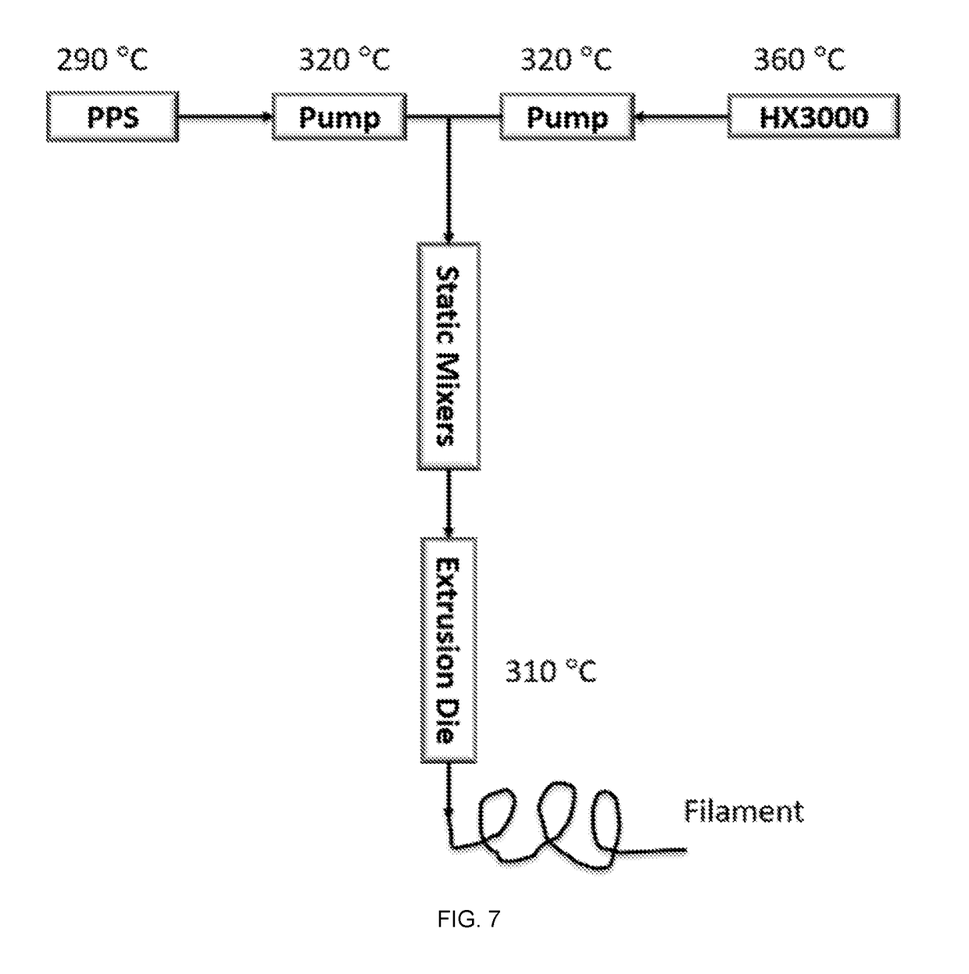
FIG. 7 is a temperature schematic used in an exemplary dual extrusion system for generating filaments composed of PPS and HX3000 according to Example 2.

Example 2: Polyphenylene Sulfide-Thermotropic Liquid Crystalline Polymers (PPS-TLCP) Filaments Generation of PPS-TLCP Filaments The PPS used in this work, Ryton, is a commercial grade and was generously supplied by Solvay. The TLCP used, HX3000, was supplied by Dupont and is believed to be synthesized from different ratios of terephthalic acid (TA), 4-hydroxybenzoic acid (HBA), hydroquinone (HQ) and hydroquinone derivatives (HQ-derivatives). The melting temperatures of the PPS and HX3000 are 285 and 320° C., respectively. The temperatures selected for generation of the filaments using dual extrusion were determined using rheological tests similar to ABS-TLCP filaments discussed earlier. The isothermal time sweeps are depicted in FIGS. 6A-6B. The temperatures selected have been shown in FIG. 7.

Figure 8A:
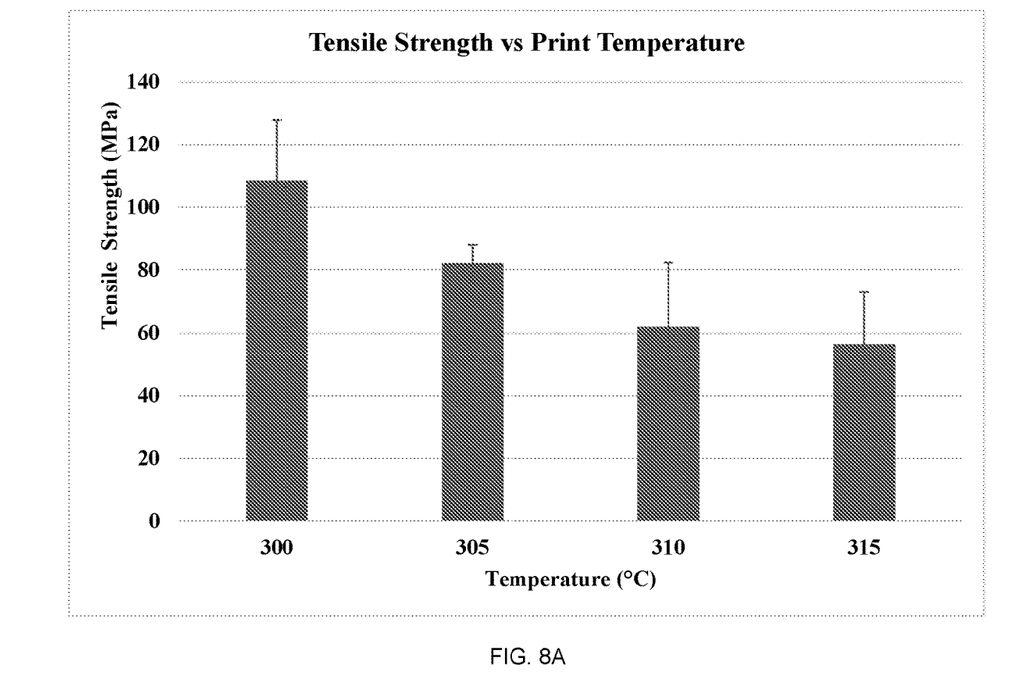
FIGS. 8A-8B are graphs of the tensile strength (FIG. 8A) and tensile modulus (FIG. 8B) as a function of print temperature. Filaments used: 67 wt. % HX3000/PPS. Error bars represent 95% confidence intervals.
Figure 8B:
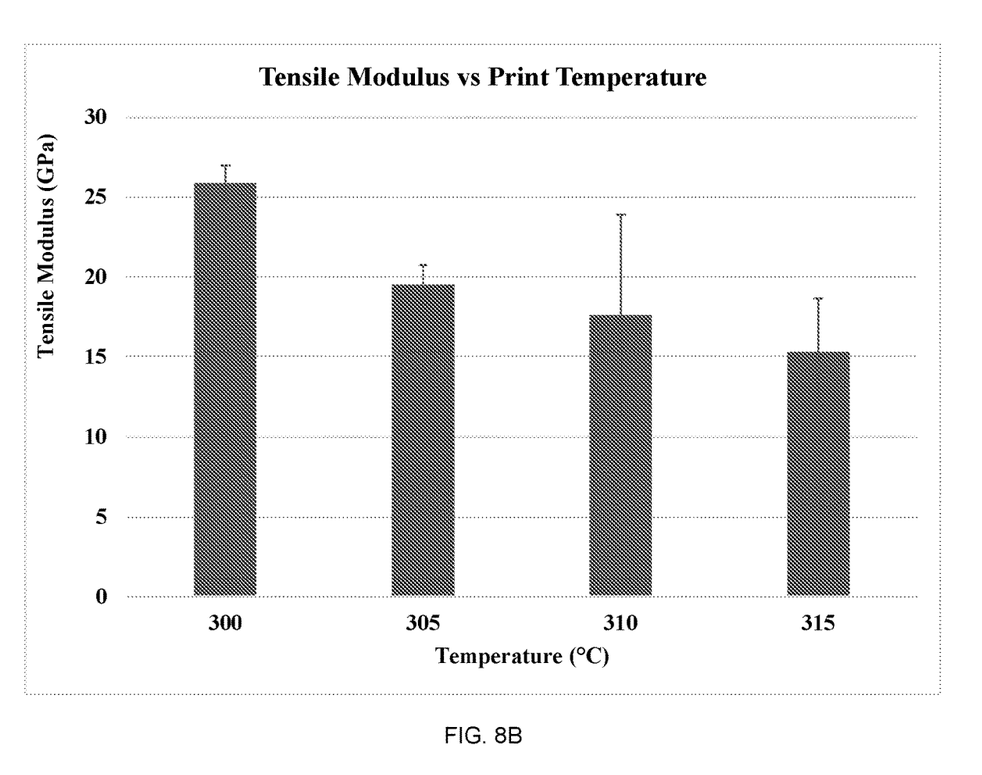
Figure 9:
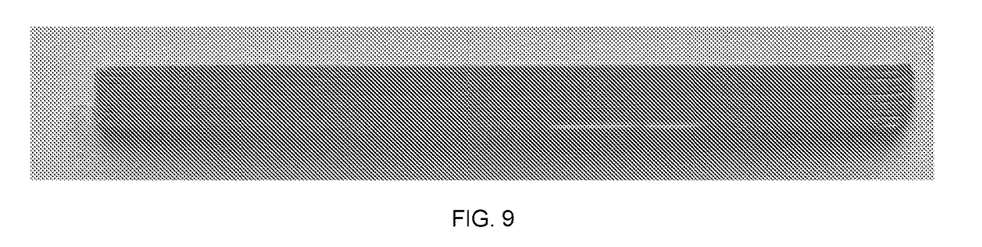
FIG. 9 is an image of a 67 wt. % HX3000/PPS strip printed using FFF according to exemplary aspects of Example 2.

The filaments generated were characterized using tensile testing to assess improvement in the mechanical properties. It was found that 67 wt. % HX3000/PPS had tensile strength and modulus of 155.0±24.2 MPa and 40.4±7.5 GPa respectively. The filaments were used to print tensile testing specimens at different print temperatures. The print patterns and the performance was similar to the ones for ABS-TLCP specimens. Tensile properties of the printed parts can be seen in FIGS. 8A-8B as a function of print temperature. Maximum strength and modulus obtained on the printed parts were 108.5±19.4 MPa and 25.9±1 GPa, respectively. This is a significant improvement in comparison with the strips that were printed using pure PPS at 310° C., the tensile strength and modulus of which were 29.6±11.3 MPa and 3.5±0.6 GPa, respectively.

References for Examples

1. Tekinalp, H. L., et al., *Highly oriented carbon fiber-polymer composites via additive manufacturing.* Composites Science and Technology, 2014. 105: p. 144-150.
2. Matsuzaki, R., et al., *Three-dimensional printing of continuous-fiber composites by in-nozzle impregnation.* Scientific reports, 2016. 6: p. 23058.
3. Van Der Klift, F., et al., *3D printing of continuous carbon fibre reinforced thermo-plastic (CFRTP) tensile test specimens.* Open Journal of Composite Materials, 2015. 6(01): p. 18.
4. Baird, D. G. and A. Sukhadia, *Mixing process for generating in-situ reinforced thermoplastics.* 1993, Google Patents.
5. Duty, C. E., et al., *Structure and mechanical behavior of Big Area Additive Manufacturing (BAAM) materials.* Rapid Prototyping Journal, 2017. 23(1): p. 181-189.
6. Handlos, A. and D. Baird, *Processing and associated properties of in situ composites based on thermotropic liquid crystalline polymers and thermoplastics.* Journal of Macromolecular Science, Part C: Polymer Reviews, 1995. 35(2): p. 183-238.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A reinforced composite filament for use in fused filament fabrication, the reinforced composite filament comprising a thermoplastic polymer matrix having dispersed therein reinforcing fibers composed of a thermotropic liquid crystalline polymer;

wherein a processing temperature for the thermoplastic polymer matrix is below a melting temperature of the thermotropic liquid crystalline polymer; and wherein a solidification temperature of the thermotropic liquid crystalline polymer is below an upper processing temperature of the thermoplastic polymer matrix; wherein the processing temperature for the thermoplastic polymer matrix is about 30° C. to about 60° C. below the melting temperature of the thermotropic liquid crystalline polymer and wherein the solidification temperature of the thermotropic liquid crystalline polymer is about 5° C. to about 20° C. below the upper processing temperature of the thermoplastic polymer matrix.

2. The reinforced composite filament according to claim 1, wherein the reinforced composite filament is made by a process comprising:
(i) heating the thermotropic liquid crystalline polymer to a first elevated temperature with respect to the melting temperature of the thermotropic liquid crystalline polymer to form a heated melt;
(ii) cooling the heated melt to a mixing temperature to form a super-cooled melt, wherein the mixing temperature is above the solidification temperature of the thermotropic liquid crystalline polymer, and wherein the mixing temperature is below the upper processing temperature of the thermoplastic polymer matrix;
(iii) heating the thermoplastic polymer matrix to the mixing temperature to form a thermoplastic melt;
(iv) blending the thermotropic liquid crystalline polymer super-cooled melt into the thermoplastic melt to form a blend; and
(v) drawing the blend into the filaments.

3. The reinforced composite filament according to claim 2, wherein the super-cooled melt is stable for a period of time from about 30 minutes to about 3 hours at the mixing temperature.

4. The reinforced composite filament according to claim 3, wherein the thermotropic liquid crystalline polymer is present in an amount from about 20 percent by weight to about 80 percent by weight based upon an entire weight of the reinforced composite filament.

5. The reinforced composite filament according to claim 3, wherein the thermotropic liquid crystalline polymer comprises fibers having an average diameter of about 0.1 microns to about 5 microns.

6. The reinforced composite filament according to claim 3, wherein the thermotropic liquid crystalline polymer exhibits supercooling properties.

7. The reinforced composite filament according claim 3, wherein the thermoplastic polymer matrix comprises a polymer selected from the group consisting of acrylonitrile butadiene styrene, polylactic acid, polycarbonate, polyphenylene sulfide, polyamide, cellulose, polyethylene terephthalate, polymethylacrylate, polymethylmethacrylate, polypropylene, polyethylene, polyvinyl chloride, polyetherimide, polyether ether ketone (PEEK) and other polyaryletherketone (PAEK), nylon 6 and other nylon polymers, and copolymers and blends thereof.

8. The reinforced composite filament according to claim 3, wherein the thermotropic liquid crystalline polymer comprises a polymer selected from the group consisting of wholly aromatic polyesters, aromatic-aliphatic polyesters, aromatic polyazomethines, aromatic polyester-carbonates, wholly or non-wholly aromatic polyester-amides, and copolymers and blends thereof.

9. The reinforced composite filament according to claim 3, further comprising one or more additives selected from the group consisting of compatiblizers, stabilizers, antioxidants, flow aids, flame retardants, impact modifiers, nucleating agents, pigments, fillers, carbon nanotubes, and additional non-polymeric reinforcement materials.

10. A method for the additive manufacturing of an object, the method comprising Fused Filament Fabrication, Fused Deposition Modeling, or Big Area Additive Manufacturing of a composite material at a processing temperature;
wherein the composite material is a reinforced composite filament for use in fused filament fabrication, the reinforced composite filament comprising a thermoplastic polymer matrix having dispersed therein reinforcing fibers composed of a thermotropic liquid crystalline polymer;
wherein a processing temperature for the thermoplastic polymer matrix is below a melting temperature of the thermotropic liquid crystalline polymer; and
wherein a solidification temperature of the thermotropic liquid crystalline polymer is below an upper processing temperature of the thermoplastic polymer matrix;
wherein the processing temperature for the thermoplastic polymer matrix is about 30° C. to about 60° C. below the melting temperature of the thermotropic liquid crystalline polymer and wherein the solidification temperature of the thermotropic liquid crystalline polymer is about 5° C. to about 20° C. below the upper processing temperature of the thermoplastic polymer matrix.

11. The method according to claim 10, wherein the composite material comprises a composite filament that has been formed into pellets.

12. A method of making the reinforced composite filament of claim 1, the method comprising:
(i) heating a thermotropic liquid crystalline polymer to a first elevated temperature with respect to the melting temperature of the thermotropic liquid crystalline polymer to form a heated melt;
(ii) cooling the heated melt to a mixing temperature to form a super-cooled melt, wherein the mixing temperature is above the solidification temperature of the thermotropic liquid crystalline polymer, and wherein the mixing temperature is below the upper processing temperature of the thermoplastic polymer matrix;
(iii) heating the thermoplastic polymer matrix to the mixing temperature to form a thermoplastic melt;
(iv) blending the thermotropic liquid crystalline polymer super-cooled melt into the thermoplastic melt to form a blend; and
(v) drawing the blend into the filaments.

* * * * *